C. F. HANGER.
DUMPING TRUCK.
APPLICATION FILED FEB. 5, 1918.

1,278,460.

Patented Sept. 10, 1918.

C. F. Hanger
Inventor

UNITED STATES PATENT OFFICE.

CHRISTIAN F. HANGER, OF CLEVELAND, OHIO.

DUMPING-TRUCK.

1,278,460.　　　　　Specification of Letters Patent.　　　Patented Sept. 10, 1918.

Application filed February 5, 1918.　Serial No. 215,470.

*To all whom it may concern:*

Be it known that I, CHRISTIAN F. HANGER, a citizen of the United States, residing at Cleveland, in the county of Cuyahoga and State of Ohio, have invented certain new and useful Improvements in Dumping-Trucks, of which the following is a specification.

This invention relates to dumping wagons or trucks, and particularly to that class thereof in which the body is pivoted at its rear end to the frame of the vehicle, and is provided with means to lift the front end to dump the contents of the body.

The object of the present invention is to provide improved means for lifting the body by hand, the arrangement being such that a great weight may be lifted by one man.

The invention is illustrated in the accompanying drawings in which—

Figure 2:
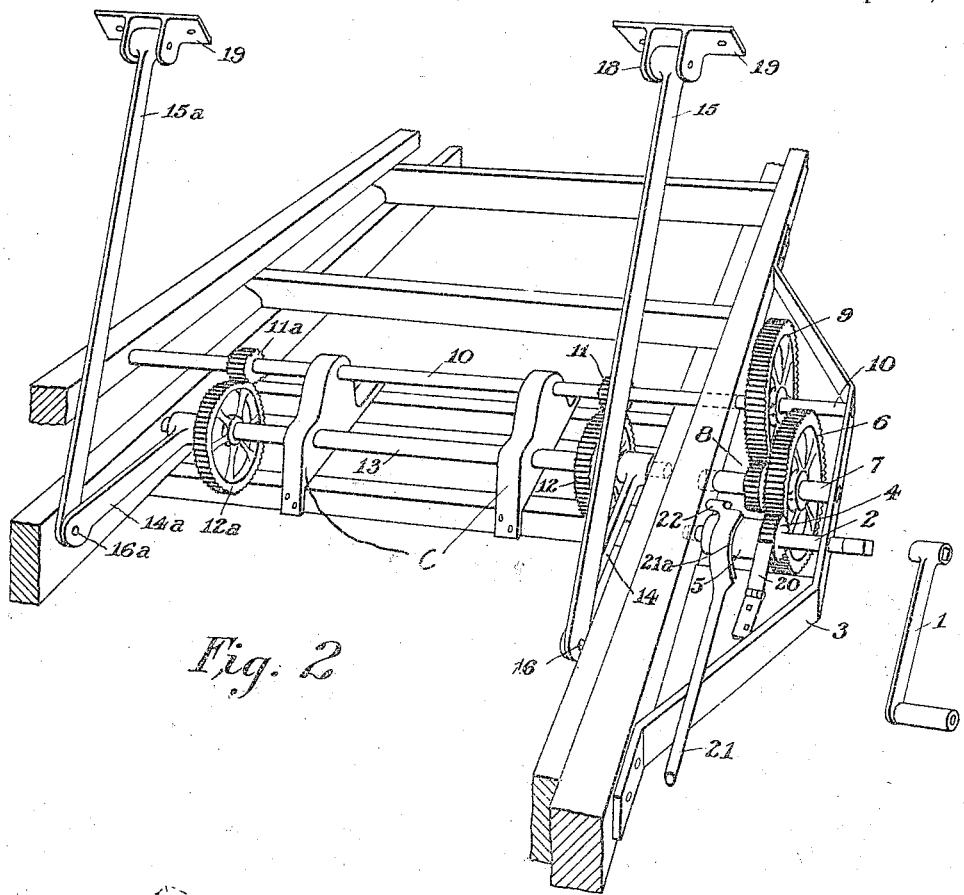
Fig. 2 is a perspective view illustrating the lifting gear.
Figure 1:
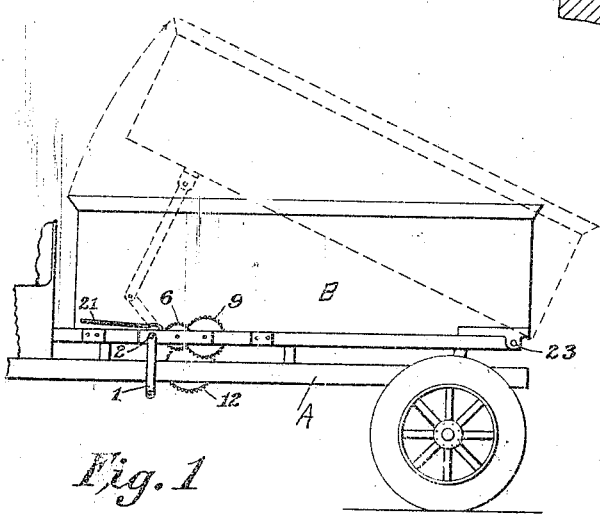
Figure 1 is a side elevation of the truck.

In the drawings. A indicates the truck frame as a whole, and B the tilting body pivoted at 23 to the rear end of the truck. The body normally rests on the frame which may be of any proper construction.

The lifting gear includes a crank handle 1 which may be applied to a shaft 2 carrying a pinion 4 in mesh with a gear 6 on a shaft 7 which carries a pinion 8 in mesh with a gear 9 on a shaft 10. These parts are supported by one of the sills of the frame, and a bracket 3 attached thereto. The shafts 2 and 7 are short shafts, but the shaft 10 extends across the frame, under the body.

This shaft 10 has thereon a pair of pinions 11 and 11$^a$ which mesh with gears 12 and 12$^a$ on a shaft 13 which extends across the frame, additional supports for the shafts 10 and 13 being indicated at C, supported on cross pieces forming part of the frame.

Rigid with the shaft 13 are a pair of arms or levers 14 and 14$^a$ which are connected by pivot pins 16 and 16$^a$ to rods 15 and 15$^a$ which are pivoted to the brackets 19 secured to the bottom of the body B.

21 is a brake lever having a shoe or face 21$^a$ which may be pressed down against a hub 5 on the shaft 2, the lever being pivoted at 22 to a pin projecting from one of the sills of the frame. 20 is a pawl which engages the pinion 4 to prevent back slip.

In operation, when the shaft 2 is turned in the proper direction, the motion is transmitted by the train of gearing to the shaft 13 which is rocked in proper direction to swing the arms 14 and 14$^a$ upwardly and lift the body by means of the connecting rods 15 and 15$^a$, thereby dumping the wagon. Then by releasing the pawl 20, the body will drop by its own weight, and this action may be delayed by pressing on the brake handle 21.

The arrangement of the two cross shafts 10 and 13, and the gearing therebetween, and the two levers and connecting rods, is such that a strong and effective lifting gear is provided, which will sustain a heavily loaded body in any position to which it may be raised, and with few and simple parts.

I claim:

In a dumping wagon the combination with a frame having longitudinal side sills and cross pieces connecting said sills, a tilting body pivoted near its rear end to the rear end of the frame, a shaft extended across between the sills and under the body and provided with pinions, a second shaft extended across between the sills and under the body and having gears in mesh with said pinions, supports on said cross pieces for the middle portions of said shafts, levers operatively connected between the last mentioned shaft and the under-side of the body, said levers being located between said supports and the side sills, and power gearing operatively engaging the first mentioned shaft.

In testimony whereof I do affix my signature in presence of two witnesses.

CHRISTIAN F. HANGER.

Witnesses:
JOHN A. BOMMHARDT,
G. W. ROSENBERG.